(12) United States Patent
Hwang et al.

(10) Patent No.: US 10,578,905 B2
(45) Date of Patent: Mar. 3, 2020

(54) LIQUID CRYSTAL DISPLAY DEVICE INCLUDING LIQUID CRYSTAL CAPSULE

(71) Applicant: LG DISPLAY CO., LTD., Seoul (KR)

(72) Inventors: Jung-Im Hwang, Paju-si (KR); Sang-Wook Lee, Paju-si (KR); Ji-Na Jeon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/188,923

(22) Filed: Nov. 13, 2018

(65) Prior Publication Data

US 2019/0155072 A1    May 23, 2019

(30) Foreign Application Priority Data

Nov. 23, 2017  (KR) .................... 10-2017-0157100

(51) Int. Cl.
*G02F 1/1334* (2006.01)
*G02F 1/1343* (2006.01)
(Continued)

(52) U.S. Cl.
CPC ............ *G02F 1/1334* (2013.01); *G02F 1/137* (2013.01); *G02F 1/13476* (2013.01); *G02F 1/133345* (2013.01); *G02F 1/133512* (2013.01); *G02F 1/133514* (2013.01); *G02F 1/133528* (2013.01); *G02F 1/134309* (2013.01); *G02F 1/136286* (2013.01); *G02F 2001/13706* (2013.01); *G02F 2001/13712* (2013.01); *G02F 2001/134381* (2013.01); *G02F 2201/121* (2013.01); *G02F 2201/123* (2013.01); *G02F 2202/28* (2013.01); *G02F 2202/36* (2013.01)

(58) Field of Classification Search
CPC ...................................................... G02F 1/1334
See application file for complete search history.

(56) References Cited

U.S. PATENT DOCUMENTS 5,194,973 A * 3/1993 Isogai .................. G02F 1/1334
                                                          349/10
5,296,952 A * 3/1994 Takatsu ............... G02F 1/13476
                                                          349/77
(Continued)

FOREIGN PATENT DOCUMENTS

KR    10-2017-0002149 A    1/2017
WO       2012053415 A1    4/2012

OTHER PUBLICATIONS

Search and Examination Report received from UKIPO dated May 31, 2019 in GB Application No. 1819079.3.

*Primary Examiner* — James A Dudek
(74) *Attorney, Agent, or Firm* — Polsinelli PC

(57) ABSTRACT

A liquid crystal display device includes a first substrate and a second substrate facing and spaced apart from each other, each of the first and second substrates including a pixel region; a first liquid crystal layer disposed on an inner surface of the first substrate and including a plurality of first liquid crystal capsules; a second liquid crystal layer disposed on an inner surface of the second substrate and including a plurality of second liquid crystal capsules; and a polarizer disposed between the first liquid crystal layer and the second liquid crystal layer, wherein each of the plurality of first liquid crystal capsules and the plurality of second liquid crystal capsules includes liquid crystal molecules and dichroic dyes.

17 Claims, 8 Drawing Sheets

(51) Int. Cl.
   *G02F 1/1333*   (2006.01)
   *G02F 1/1335*   (2006.01)
   *G02F 1/1362*   (2006.01)
   *G02F 1/137*    (2006.01)
   *G02F 1/1347*   (2006.01)

(56) References Cited

U.S. PATENT DOCUMENTS

| | | | | |
|---|---|---|---|---|
| 5,986,729 | A * | 11/1999 | Yamanaka | G02F 1/1333 349/79 |
| 6,181,393 | B1 * | 1/2001 | Enomoto | G02F 1/133377 349/79 |
| 6,211,931 | B1 * | 4/2001 | Fukao | C09K 19/544 349/74 |
| 6,278,505 | B1 * | 8/2001 | Okada | C09K 19/586 349/110 |
| 2005/0195354 | A1 * | 9/2005 | Doane | B32B 27/00 349/143 |
| 2007/0085788 | A1 * | 4/2007 | Harada | G02F 1/135 345/84 |
| 2008/0094551 | A1 * | 4/2008 | Hayashi | G02F 1/13475 349/106 |
| 2010/0060825 | A1 * | 3/2010 | Jang | B82Y 20/00 349/86 |
| 2010/0302488 | A1 * | 12/2010 | Asaoka | G02F 1/1334 349/123 |
| 2011/0261303 | A1 * | 10/2011 | Jang | G02F 1/13318 349/108 |
| 2015/0185518 | A1 * | 7/2015 | Igarashi | G02F 1/1334 349/12 |
| 2016/0062175 | A1 * | 3/2016 | Jeon | G02F 1/133377 349/43 |
| 2017/0261782 | A1 * | 9/2017 | Lee | G02F 1/1334 |

* cited by examiner

LIQUID CRYSTAL DISPLAY DEVICE INCLUDING LIQUID CRYSTAL CAPSULE

CROSS REFERENCE TO RELATED APPLICATION

This application claims the benefit under 35 U.S.C. § 119(a) of Korean Patent Application No. 2017-0157100, filed on Nov. 23, 2017, in the Korean Intellectual Property Office, which is incorporated herein by reference in its entirety.

BACKGROUND

Field of the Disclosure

The present disclosure relates to a liquid crystal display device, and more particularly, to a liquid crystal display device including a liquid crystal capsule.

Description of the Background

Recently, as the era rapidly progresses into the information society, a display field for processing and displaying a large amount of information has been developed. In order to respond to the current demand, flat panel display devices need to be thin, light-weight, and low power consumption.

Accordingly, thin film transistor-liquid crystal display (TFT-LCD) devices which have high color reproducibility and are thin have been developed. A liquid crystal display device displays an image using optical anisotropy and polarization properties of liquid crystal molecules.

A related art liquid crystal display device will be described with reference to the accompanying drawing.

FIG. 1 is a cross-sectional view showing a related art liquid crystal display device.

As shown in FIG. 1, the related art liquid crystal display device 10 includes first and second substrates 20 and 40, which face each other and are spaced apart from each other, and a liquid crystal layer 50 interposed between the first and second substrates 20 and 40.

Specifically, a gate electrode 22 is formed in each pixel region P on an inner surface of the first substrate 20, and a gate insulating layer 24 is formed on the gate electrode 22.

A semiconductor layer 26 is formed on the gate insulating layer 24 corresponding to the gate electrode 22, and a source electrode 28 and a drain electrode 30, which are spaced apart from each other, are formed on the semiconductor layer 26.

The gate electrode 22, the semiconductor layer 26, the source electrode 28, and the drain electrode 30 constitute a thin film transistor T.

A passivation layer 32 is formed on the thin film transistor T, and a pixel electrode 34 connected to the drain electrode 30 is formed on the passivation layer 32.

A first polarizer 36 is formed on an outer surface of the first substrate 20.

Further, a black matrix 42 is formed at a boundary of the pixel region P on an inner surface of the second substrate 40, a color filter layer 44 is formed in the pixel region P below the black matrix 42, and a common electrode 46 is formed under the color filter layer 44.

A second polarizer 48 is formed on an outer surface of the second substrate 40.

Further, the liquid crystal layer 50 including a plurality of liquid crystal molecules 52 is formed between the pixel electrode 34 of the first substrate 20 and the common electrode 46 of the second substrate 40.

In the liquid crystal display device 10, when the thin film transistor T is turned on in response to a gate signal applied to the gate electrode 22, a data signal is applied to the pixel electrode 34 through the thin film transistor T and an electric field is generated between the pixel electrode 34 and the common electrode 46.

The plurality of liquid crystal molecules 52 of the liquid crystal layer 50 are realigned according to the electric field so that a gray level corresponding to the data signal is displayed in the corresponding pixel region P.

In the liquid crystal display device 10, a backlight unit (not shown) supplies the same amount of light to all of the pixel regions P of the display panel regardless of the gray level corresponding to the data signal, and thus a contrast ratio of an image is determined by a contrast ratio property (light transmission and light blocking performance) of the display panel itself. As a result, there is a problem in that the improvement of the contrast ratio is limited.

For example, in an in-plane switching (IPS) type liquid crystal display device in which a pixel electrode and a common electrode are formed on the same substrate, there is a problem in that a contrast ratio is limited to 2,000:1 or less.

In order to solve the above problem, a liquid crystal display device in which a liquid crystal shutter panel for blocking or transmitting light of a backlight unit for each pixel region is disposed below a liquid crystal display panel has been proposed.

However, in the liquid crystal display device including the liquid crystal display panel and the liquid crystal shutter panel, the liquid crystal display panel and the liquid crystal shutter panel use four substrates in total, and thus there is a problem in that a total thickness and weight of the liquid crystal display are inevitably increased.

In addition, in order to form two liquid crystal layers of the liquid crystal display panel and the liquid crystal shutter panel, it is necessary to perform four alignment film forming processes each including coating, curing, and rubbing steps and perform two liquid crystal dropping processes and two bonding processes. Therefore, there is a problem in that manufacturing processes becomes complicated.

Further, it is difficult to maintain an initial alignment of liquid crystals according to the deformation of the substrate, and since four substrates are used, this liquid crystal display device is difficult to be applied to a flexible display device in the future.

SUMMARY

Accordingly, the present disclosure is directed to a liquid crystal display device including a liquid crystal capsule that substantially obviates one or more of the problems due to limitations and disadvantages of the related art.

More specifically, the present disclosure is to provide a liquid crystal display device including a liquid crystal capsule in which the number of substrates to be used is reduced, a thickness and weight thereof are reduced, a contrast ratio is improved, and the liquid crystal display device is easily applicable to a flexible display device.

In addition, the present disclosure is to provide a liquid crystal display device including a liquid crystal capsule in which upper and lower polarizers are omissible, a thickness of the liquid crystal display device is further reduced, and a contrast ratio and sharpness of an image are further improved.

Additional features and advantages of the present disclosure will be set forth in the description which follows, and in part will be apparent from the description, or may be learned by practice of the present disclosure. Other advantages of the present disclosure will be realized and attained by the structure particularly pointed out in the written description and claims hereof as well as the appended drawings.

To achieve these and other advantages and in accordance with the purpose of the present disclosure, as embodied and broadly described herein, there is provided a liquid crystal display device that includes a first substrate and a second substrate facing and spaced apart from each other, each of the first and second substrates including a pixel region; a first liquid crystal layer disposed on an inner surface of the first substrate and including a plurality of first liquid crystal capsules; a second liquid crystal layer disposed on an inner surface of the second substrate and including a plurality of second liquid crystal capsules; and a polarizer disposed between the first liquid crystal layer and the second liquid crystal layer, wherein each of the plurality of first liquid crystal capsules and the plurality of second liquid crystal capsules includes liquid crystal molecules and dichroic dyes.

It is to be understood that both the foregoing general description and the following detailed description are explanatory, and are intended to provide further explanation of the aspects as claimed.

BRIEF DESCRIPTION OF THE DRAWINGS

The accompanying drawings, which are included to provide a further understanding of the disclosure, are incorporated in and constitute a part of this application, illustrate implementations of the disclosure and together with the description serve to explain the principles of aspects of the disclosure.

In the drawings.

DETAILED DESCRIPTION

Hereinafter, aspects of the present disclosure will be described with reference to the accompanying drawings.

Figure 2:
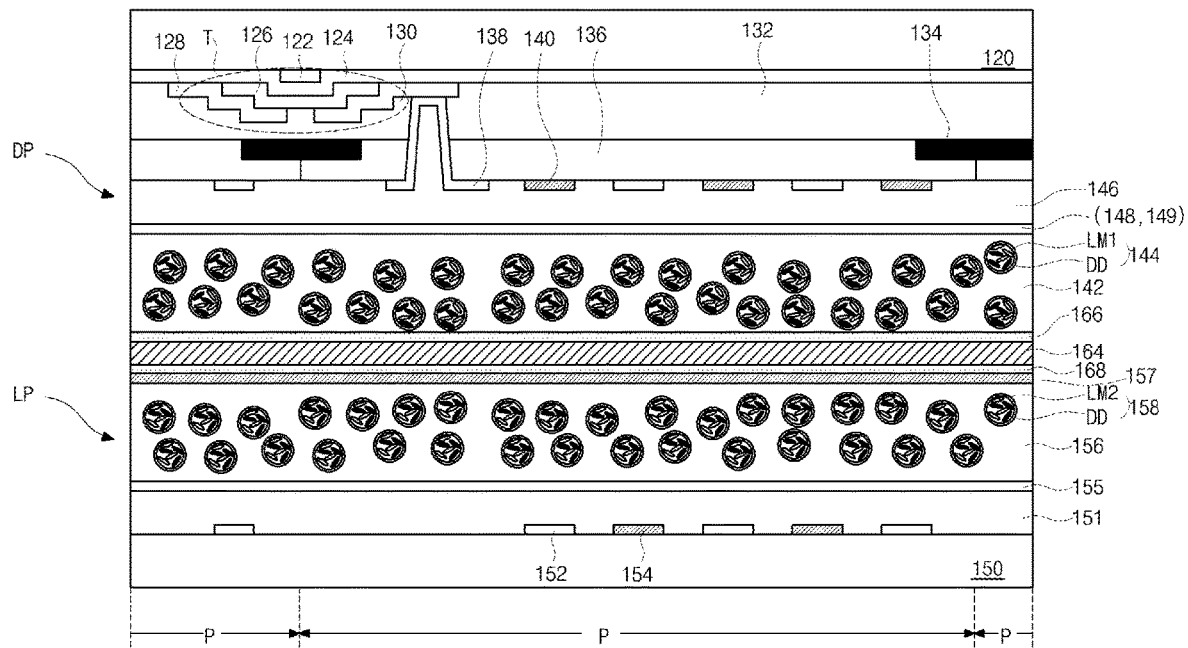
FIG. 2 is a cross-sectional view showing a liquid crystal display device according to an aspect of the present disclosure.

FIG. 2 is a cross-sectional view showing a liquid crystal display device according to an aspect of the present disclosure.

As shown in FIG. 2, a liquid crystal display device 100 according to the aspect of the present disclosure includes first and second substrates 120 and 150, which face each other and are spaced apart from each other, and first and second liquid crystal layers 142 and 156 formed between the first and second substrates 120 and 150.

Specifically, a gate electrode 122 is formed in each of pixel regions P on an inner surface of the first substrate 120, and a gate insulating layer 124 is formed under the gate electrode 122 substantially all over the first substrate 120. The gate insulating layer 124 contacts the inner surface of the first substrate 120 and covers the gate electrode 122.

A semiconductor layer 126 is formed under the gate insulating layer 124 corresponding to the gate electrode 122, and a source electrode 128 and a drain electrode 130, which are spaced apart from each other, are formed under the semiconductor layer 126.

The gate electrode 122, the semiconductor layer 126, the source electrode 128, and the drain electrode 130 constitute a thin film transistor T.

Although not shown, a gate line and a data line, which cross each other to define the pixel region P and transmit a gate signal and a data signal, respectively, may be formed on the inner surface of the first substrate 120, and the gate line and the data line may be connected to the gate electrode 122 and the source electrode 128, respectively.

A first passivation layer 132 may be formed under the thin film transistor substantially all over the first substrate 120, and a black matrix 134 may be formed at a boundary of the pixel region P below the first passivation layer 132.

A color filter layer 136 including red, green, and blue color filters corresponding to respective pixel regions P may be formed under the black matrix 134, and the first substrate 120 on which the thin film transistor T and the color filter layer 136 are formed may have a color-filter-on-TFT (COT) structure.

A first electrode 138 and a second electrode 140, which are alternately disposed and spaced apart from each other in a first direction, are formed in each pixel region P below the color filter layer 136. The first electrode 138 and the second electrode 140 may have a bar shape, and the first electrode 138 may be connected to the thin film transistor T.

Further, a second passivation layer 146 may be formed under the first electrode 138 and the second electrode 140 substantially all over the first substrate 120.

A third electrode 148 and a fourth electrode 149, which are alternately disposed and spaced apart from each other in a second direction perpendicular to the first direction, are formed in each pixel region P below the second passivation layer 146. The third electrode 148 and the fourth electrode 149 may have a bar shape. Although not shown, the third electrode 148 may be connected to another thin film transistor different from the thin film transistor T connected to the first electrode 138.

The first liquid crystal layer 142, which includes a plurality of first liquid crystal capsules 144 and a first binder surrounding the plurality of first liquid crystal capsules 144, is formed under the third electrode 148 and the fourth electrode 149 substantially all over the first substrate 120. Each of the plurality of first liquid crystal capsules 144 may include a plurality of first liquid crystal molecules LM1 and dichroic dyes DD.

Here, each of the plurality of first liquid crystal capsules 144 may be a polymer capsule having a diameter of several to several hundred nanometers and may be formed of a positive or negative nematic liquid crystal. Each of the plurality of first liquid crystal molecules LM1 may be a nematic liquid crystal, a ferroelectric liquid crystal, or a flexoelectric liquid crystal.

The dichroic dyes DD may have different light absorbance in a major axis direction and a minor axis direction. For example, the dichroic dyes DD may have the much higher light absorbance in the major axis direction than that in the minor axis direction, but the present disclosure is not limited thereto. Alternatively, the dichroic dyes DD may have the much higher light absorbance in the minor axis direction than that in the major axis direction.

Hereinafter, an example of a case in which the dichroic dyes DD have the higher light absorbance in the major axis direction than that in the minor axis direction will be described.

Further, the dichroic dyes DD may be a dye which absorbs entire light in a visible light region, or different types of dichroic dyes DD may absorb light in different bands within a visible light region and absorb the entire light in a visible light region as a whole to display black.

The dichroic dyes DD may include azo-based dyes, anthraquinone-based dyes, perylene-based dyes, quinophthalone-based dyes, azomethine-based dyes, tolane-based dyes, or combinations thereof, but the present disclosure is not limited thereto.

In addition, the dichroic dyes DD may have a rod shape like the first liquid crystal molecules LM1. When the dichroic dyes DD are mixed with the first liquid crystal molecules LM1, the dichroic dyes DD may be aligned in an alignment direction of the first liquid crystal molecules LM1 to absorb light.

Further, the dichroic dyes DD are not operated by an electric field and operation of the dichroic dyes DD may depend on the behavior of the first liquid crystal molecules LM1. Accordingly, the dichroic dyes DD may be operated together with the first liquid crystal molecules LM1 to perform a light control function.

Moreover, a first adhesive layer 166 may be formed on a substantially entire lower surface of the first liquid crystal layer 142, and a polarizer 164 may be formed on a substantially entire lower surface of the first adhesive layer 166.

Further, a second adhesive layer 168 may be formed on a substantially entire lower surface of the polarizer 164.

Here, the polarizer 164 may be attached to the first liquid crystal layer 142 by the first adhesive layer 166 and attached to an eighth electrode 157 formed on an upper surface of the second liquid crystal layer 156 which will be described below by the second adhesive layer 168.

Meanwhile, fifth and sixth electrodes 152 and 154, which are spaced apart from each other in the first direction, may be formed in each pixel region P on an inner surface of the second substrate 150, and each of the fifth and sixth electrodes 152 and 154 may have a bar shape.

That is, the fifth and sixth electrodes 152 and 154 may be spaced apart from each other in the same direction as the first direction in which the first and second electrodes 138 and 140 are spaced apart from each other.

Although not shown, a shutter gate line and a shutter data line, which cross each other to define the pixel region P and transmit a shutter gate signal and a shutter data signal, respectively, may be formed on an upper surface of the second substrate 150, and a shutter thin film transistor may be formed in each pixel region P.

In addition, each of the shutter gate line and the shutter data line may be connected to the shutter thin film transistor, the fifth electrode 152 may be connected to the shutter thin film transistor, and the sixth electrode 154 may be connected to a common voltage terminal.

Further, a third passivation layer 151 may be disposed on the fifth and sixth electrodes 152 and 154 substantially all over the second substrate 150. A plate-shaped seventh electrode 155 may be formed on the third passivation layer 151. Although not shown, the seventh electrode 155 may be connected to another shutter thin film transistor different from the shutter thin film transistor connected to the fifth electrode 152.

The second liquid crystal layer 156, which includes a plurality of second liquid crystal capsules 158 and a second binder surrounding the plurality of second liquid crystal capsules 158, is formed on the seventh electrode 155 substantially all over the second substrate 150. Each of the plurality of second liquid crystal capsules 158 may include a plurality of second liquid crystal molecules LM2 and dichroic dyes DD.

Here, each of the plurality of second liquid crystal capsules 158 may be a polymer capsule having a diameter of several to several hundred nanometers and may be formed of a positive or negative nematic liquid crystal. Each of the plurality of second liquid crystal molecules LM2 may be a nematic liquid crystal, a ferroelectric liquid crystal, or a flexoelectric liquid crystal.

The dichroic dyes DD may have different light absorbance in a major axis direction and a minor axis direction. For example, the dichroic dyes DD may have the much higher light absorbance in the major axis direction than that in the minor axis direction, but the present disclosure is not limited thereto. Alternatively, the dichroic dyes DD may have the much higher light absorbance in the minor axis direction than that in the major axis direction.

Hereinafter, an example of a case in which the dichroic dyes DD have the higher light absorbance in the major axis direction than that in the minor axis direction will be described.

Further, the dichroic dyes DD may be a dye which absorbs entire light in a visible light region, or different types of dichroic dyes DD may absorb light in different bands in a visible light region and absorb the entire light in a visible light region as a whole to display black.

The dichroic dyes DD may include azo-based dyes, anthraquinone-based dyes, perylene-based dyes, quinophthalone-based dyes, azomethine-based dyes, tolane-based dyes, or combinations thereof, but the present disclosure is not limited thereto.

In addition, the dichroic dyes DD may have a rod shape like the second liquid crystal molecules LM2. When the dichroic dyes DD are mixed with the second liquid crystal molecules LM2, the dichroic dyes DD may be aligned in an alignment direction of the second liquid crystal molecules LM2 to absorb light.

Further, the dichroic dyes DD are not operated by an electric field, and operation of the dichroic dyes DD may depend on the behavior of the second liquid crystal molecules LM2. Accordingly, the dichroic dyes DD may be operated together with the second liquid crystal molecules LM2 to perform a light control function.

Moreover, the plate-shaped eighth electrode 157 may be formed on the second liquid crystal layer 156.

Although not shown, a backlight unit may be disposed below the second substrate 150.

In the liquid crystal display device 100 according to the aspect of the present disclosure, the first substrate 120, the first liquid crystal layer 142, and the polarizer 164 may constitute a display panel DP on which an image is displayed, and the second substrate 150, the second liquid crystal layer 156, and the polarizer 164 may constitute a shutter panel LP on which light of the backlight unit is blocked or transmitted for each pixel region P. Since the shutter panel LP serves to simply block or transmit light, the color filter layer may be omitted.

Specifically, in the liquid crystal display device 100 according to the aspect of the present disclosure, since each of the first liquid crystal layer 142 of the display panel DP and the second liquid crystal layer 156 of the shutter panel LP includes the dichroic dyes DD, a polarizing function may be performed by adjusting directions of transmission axes of the first liquid crystal layer 142 and the second liquid crystal layer 156 on the basis of a transmission axis of the polarizer 164.

Figure 1:
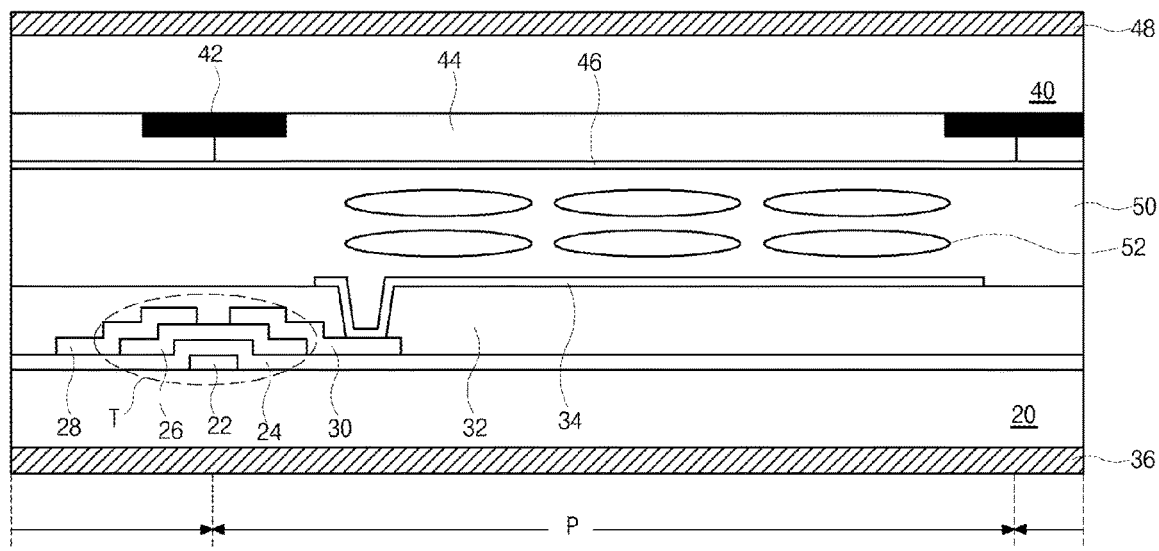
FIG. 1 is a cross-sectional view showing a related art liquid crystal display device.

Accordingly, the polarizers 36 and 48 of FIG. 1 of the related art respectively formed on the outer surfaces of the first substrate 20 of FIG. 1 and the second substrate 40 of FIG. 1 can be removed. Therefore, a process can be simplified, a thin liquid crystal display device can be implemented, and a contrast ratio can be improved.

The adjustment of the transmission axes of the first liquid crystal layer 142 and the second liquid crystal layer 156 will be described below in more detail.

As described above, in the liquid crystal display device 100 according to the aspect of the present disclosure, a horizontal electric field, which is substantially parallel to the first substrate 120, may be generated between the first electrode 138 and the second electrode 140, and a horizontal electric field, which is substantially parallel to the first substrate 120, may be generated between the third electrode 148 and the fourth electrode 149. The horizontal electric field generated between the first electrode 138 and the second electrode 140 and the horizontal electric field generated between the third electrode 148 and the fourth electrode 149 may perpendicularly cross each other.

Accordingly, the plurality of first liquid crystal molecules LM1 and the dichroic dyes DD inside the plurality of first liquid crystal capsules 144 of the first liquid crystal layer 142 may be realigned according to the electric field and a gray level corresponding to the data signal may be displayed in the pixel region P of the display panel DP.

Further, a horizontal electric field, which is substantially parallel to the second substrate 150, may be generated between the fifth electrode 152 and the sixth electrode 154 and a vertical electric field, which is perpendicular to the second substrate 150, may be generated between the seventh electrode 155 and the eighth electrode 157.

Accordingly, the plurality of second liquid crystal molecules LM2 and the dichroic dyes DD inside the plurality of second liquid crystal capsules 158 of the second liquid crystal layer 156 may be realigned according to the electric field and the light of the backlight unit may be blocked or transmitted in the pixel region P of the shutter panel LP.

In this case, by making a transmittance corresponding to the shutter data signal be proportional to a transmittance corresponding to the data signal, a contrast ratio of the liquid crystal display device 100 can be improved.

For example, when a data signal applied to a specific pixel region P of the display panel DP corresponds to a high gray level, a shutter data signal applied to the corresponding pixel region P of the shutter panel LP may be made to correspond to a relatively high transmittance. When the data signal applied to the specific pixel region P of the display panel DP corresponds to a low gray level, the shutter data signal applied to the corresponding pixel region P of the shutter panel LP may be made to correspond to a relatively low transmittance.

Accordingly, a larger amount of light is supplied to the pixel region P displaying an image of the high gray level and brightness is further increased, and a smaller amount of light is supplied to the pixel region P displaying an image of the low gray level and brightness is further reduced, and thus a contrast ratio of the image displayed on the liquid crystal display device 100 can be improved.

The liquid crystal display device 100 according to the aspect of the present disclosure is described with an example in which the brightness of the image displayed on the display panel DP may be adjusted for each pixel region P by making the pixel region P of the display panel DP and the pixel region P of the shutter panel LP correspond one-to-one with each other (i.e., by making a resolution of the display panel DP and a resolution of the shutter panel LP equal to each other). However, in another aspect, by making one pixel region P of the shutter panel LP correspond to the plurality of pixel regions P of the display panel DP (i.e., by making the resolution of the shutter panel LP smaller than the resolution of the display panel DP), the brightness of the image displayed on the display panel DP may be adjusted for each block composed of the plurality of pixel regions P. In this case, an alignment margin between the display panel DP and the shutter panel LP can be sufficiently secured and process reliability and yield can be improved.

Figure 3A:
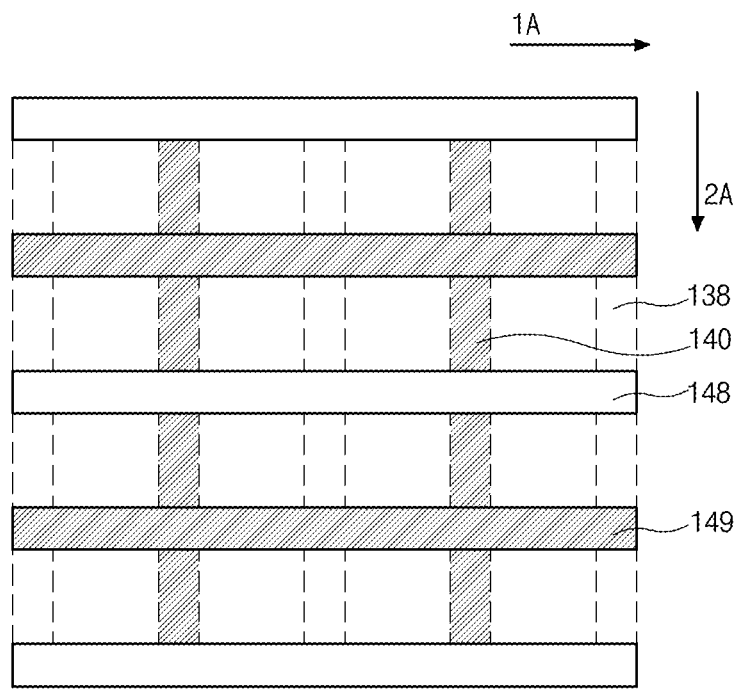
FIG. 3A is a plan view schematically showing first to fourth electrodes of a liquid crystal display device according to an aspect of the present disclosure.
Figure 3B:
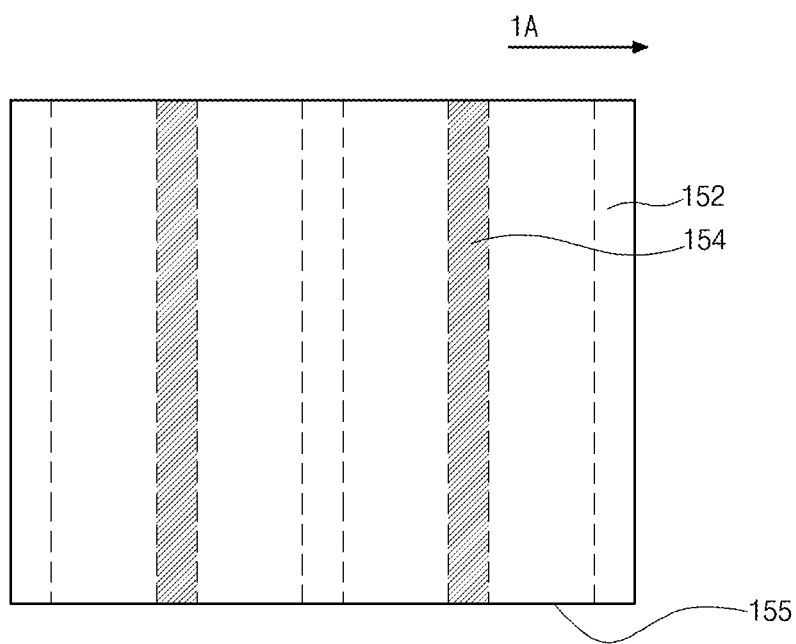
FIG. 3B is a plan view schematically showing fifth to seventh electrodes of the liquid crystal display device according to the aspect of the present disclosure.

FIG. 3A is a plan view schematically showing the first to fourth electrodes of the liquid crystal display device according to the aspect of the present disclosure, and FIG. 3B is a plan view schematically showing the fifth to seventh electrodes of the liquid crystal display device according to the aspect of the present disclosure.

As shown in FIG. 3A, in the display panel DP of FIG. 2 of the liquid crystal display device 100 of FIG. 2 according to the aspect of the present disclosure, the first electrode 138 and the second electrode 140, which are alternately disposed and spaced apart from each other in each pixel region P of FIG. 2 in a first direction 1A, may be formed.

In addition, the first electrode 138 and the second electrode 140 may have a bar shape, but the present disclosure is not limited thereto.

Further, the third electrode 148 and the fourth electrode 149, which face the first electrode 138 and the second electrode 140 with the second passivation layer 146 of FIG. 2 interposed therebetween, may be formed.

Here, the third electrode 148 and the fourth electrode 149 may be alternately disposed and spaced apart from each other in a second direction 2A perpendicular to the first direction 1A.

Further, the third electrode 148 and the fourth electrode 149 may have a bar shape, but the present disclosure is not limited thereto.

Accordingly, a horizontal electric field, which is substantially parallel to the first substrate 120 of FIG. 2, may be generated in the display panel DP in the first direction 1A by the first electrode 138 and the second electrode 140, and a horizontal electric field, which is substantially parallel to the first substrate 120 of FIG. 2, may be generated in the display panel DP in the second direction 2A by the third electrode 148 and the fourth electrode 149.

Further, as shown in FIG. 3B, in the shutter panel LP of FIG. 2 of the liquid crystal display device 100 of FIG. 2 according to the aspect of the present disclosure, the fifth electrode 152 and the sixth electrode 154, which are alternately disposed and spaced apart from each other in each pixel region P of FIG. 2 in first direction 1A, may be formed.

Moreover, the fifth electrode 152 and the sixth electrode 154 may have a bar shape, but the present disclosure is not limited thereto.

In addition, the plate-shaped seventh electrode 155 facing the fifth electrode 152 and the sixth electrode 154 with the third passivation layer 151 of FIG. 2 interposed therebetween may be formed.

Although not shown, the plate-shaped eighth electrode 157 of FIG. 2 facing the seventh electrode 155 with the second liquid crystal layer 156 of FIG. 2 interposed therebetween may be formed.

Therefore, a horizontal electric field, which is substantially parallel to the second substrate 150 of FIG. 2, may be generated in the shutter panel LP in the first direction 1A by the fifth electrode 152 and the sixth electrode 154, and a vertical electric field, which is perpendicular to the second substrate 150 of FIG. 2, may be generated in the shutter panel LP by the plate-shaped seventh electrode 155 and eighth electrode 157 of FIG. 2 facing each other.

Figure 4A:
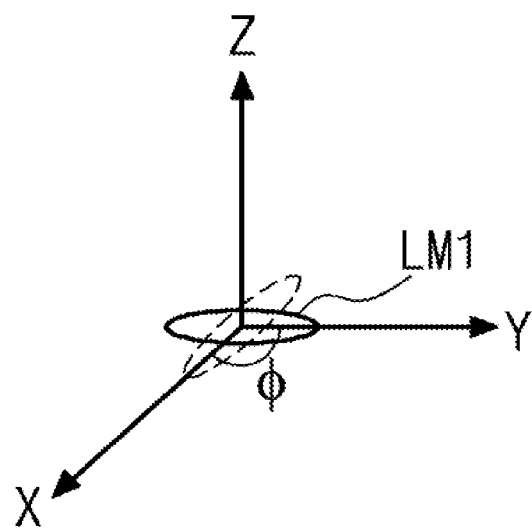
FIG. 4A is a schematic view showing an alignment direction of first liquid crystal molecules of a liquid crystal display device according to an aspect of the present disclosure.
Figure 4B:
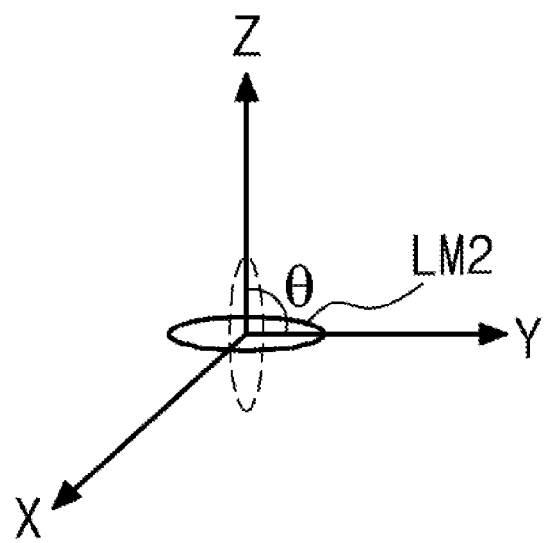
FIG. 4B is a schematic view showing an alignment direction of second liquid crystal molecules of the liquid crystal display device according to the aspect of the present disclosure.

FIG. 4A is a schematic view showing an alignment direction of the first liquid crystal molecules of the liquid crystal display device according to the aspect of the present disclosure, and FIG. 4B is a schematic view showing an alignment direction of the second liquid crystal molecules of the liquid crystal display device according to the aspect of the present disclosure. Descriptions will also be made with reference to FIG. 2.

As shown in FIG. 4A, the first liquid crystal molecules LM1 of the first liquid crystal capsules 144 disposed in the first liquid crystal layer 142 may be rotated on a first plane by the electric field.

That is, the first liquid crystal molecules LM1 may be rotated on the first plane consisting of an X axis and a Y axis.

Here, a rotation angle $\phi$ of the first liquid crystal molecules LM1 may be between 0° and 90°($0°<\phi<90°$), but the present disclosure is not limited thereto.

Further, the first plane may be parallel to the polarizer 164. That is, major axes of the first liquid crystal molecules LM1 may be rotated on the first plane parallel to the polarizer 164.

As shown in FIG. 4B, the second liquid crystal molecules LM2 of the second liquid crystal capsules 158 disposed in the second liquid crystal layer 156 may be rotated on a second plane perpendicular to the first plane by the electric field.

That is, the second liquid crystal molecules LM2 may be rotated on the second plane consisting of the Y axis (or the X axis) and a Z axis.

Here, a rotation angle $\theta$ of the second liquid crystal molecules LM2 may be between 0° and 90° ($0°<\theta<90°$), but the present disclosure is not limited thereto.

Further, the second plane may be perpendicular to the polarizer 164. That is, major axes of the second liquid crystal molecules LM2 may be rotated on the second plane perpendicular to the polarizer 164.

Figure 5A:
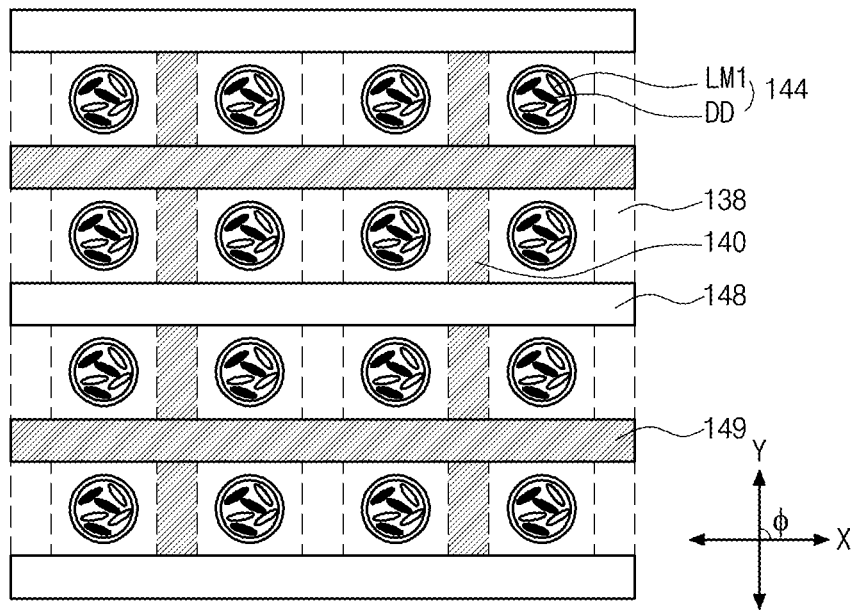
FIGS. 5A to 5C are plan views schematically showing an alignment of first liquid crystal molecules and dichroic dyes according to a voltage applied to a display panel of the present disclosure.
Figure 5B:
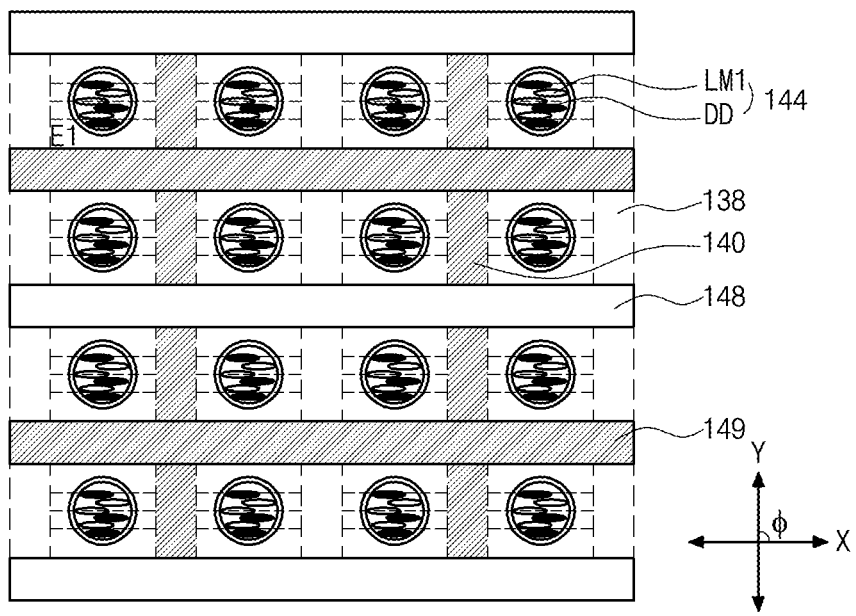
Figure 5C:
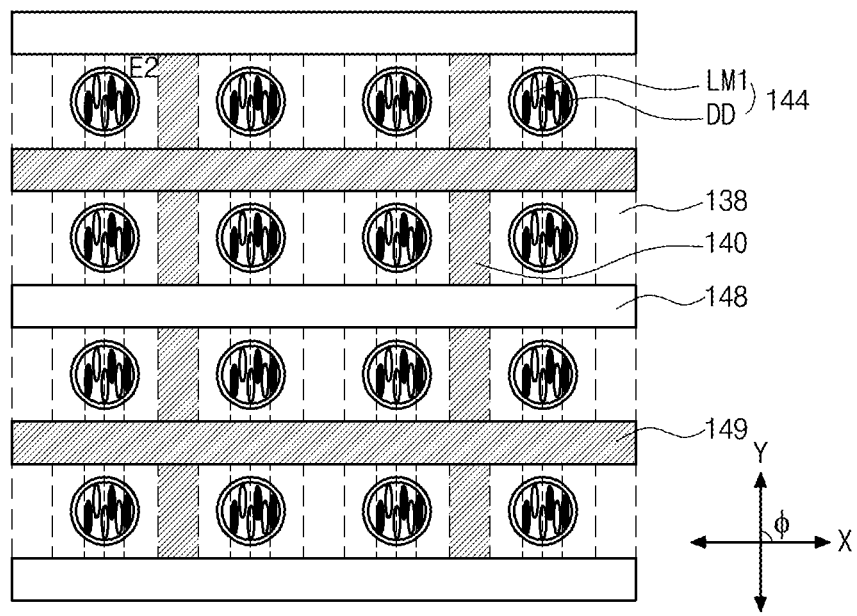

FIGS. 5A to 5C are plan views schematically showing an alignment of the first liquid crystal molecules and the dichroic dyes according to a voltage applied to the display panel of the present disclosure. Descriptions will also be made with reference to FIG. 2.

Here, when the first liquid crystal molecules LM1 are liquid crystal molecules having a negative (−) dielectric anisotropy ($\Delta\varepsilon<0$), the major axes of the first liquid crystal molecules LM1 are aligned perpendicularly to a direction of an electric field, and when the first liquid crystal molecules LM1 are liquid crystal molecules having a positive (+) dielectric anisotropy ($\Delta\varepsilon>0$), the major axes of the first liquid crystal molecules LM1 are aligned in parallel to the direction of the electric field.

Hereinafter, an example of a case in which the first liquid crystal molecules LM1 are positive liquid crystal molecules will be described.

As shown in FIG. 5A, when a voltage is not applied to the first to fourth electrodes 138, 140, 148, and 149 of the display panel DP, the respective major axes of the plurality of first liquid crystal molecules LM1 and the dichroic dyes DD may be randomly aligned.

As shown in FIG. 5B, when a voltage is applied to the first electrode 138 and the second electrode 140, a horizontal electric field E1, which is substantially parallel to the first substrate 120, may be generated between the first electrode 138 and the second electrode 140, and as a result, the major axes of the first liquid crystal molecules LM1 and the dichroic dyes DD of each of the plurality of first liquid crystal capsules 144 included in the first liquid crystal layer 142 may be aligned in an X-axis direction along the horizontal electric field El generated between the first electrode 138 and the second electrode 140.

Further, as shown in FIG. 5C, when a voltage is applied to the third and fourth electrodes 148 and 149, a horizontal electric field E2, which is substantially parallel to the first substrate 120, may be generated between the third and fourth electrodes 148 and 149, and as a result, the major axes of the first liquid crystal molecules LM1 and the dichroic dyes DD of each of the plurality of first liquid crystal capsules 144 included in the first liquid crystal layer 142 may be aligned in a Y-axis direction along the horizontal electric field E2 generated between the third electrode 148 and the fourth electrode 149.

Here, the first and second electrodes 138 and 140 and the third and fourth electrodes 148 and 149 may be individually driven, or may be simultaneously driven.

That is, in order to align the major axes of the first liquid crystal molecules LM1 and the dichroic dyes DD in the X-axis direction, only the first electrode 138 and the second electrode 140 may be driven, and in order to align the major axes of the first liquid crystal molecules LM1 and the dichroic dyes DD in the Y-axis direction, only the third electrode 148 and the fourth electrode 149 may be driven. Alternatively, in a state in which the first electrode 138 and the second electrode 140 are driven so that the major axes of the first liquid crystal molecules LM1 and the dichroic dyes DD are aligned in the X-axis direction, the major axes of the first liquid crystal molecules LM1 and the dichroic dyes DD may be adjusted in the Y-axis direction by driving the third electrode 148 and the fourth electrode 149.

Figure 6A:
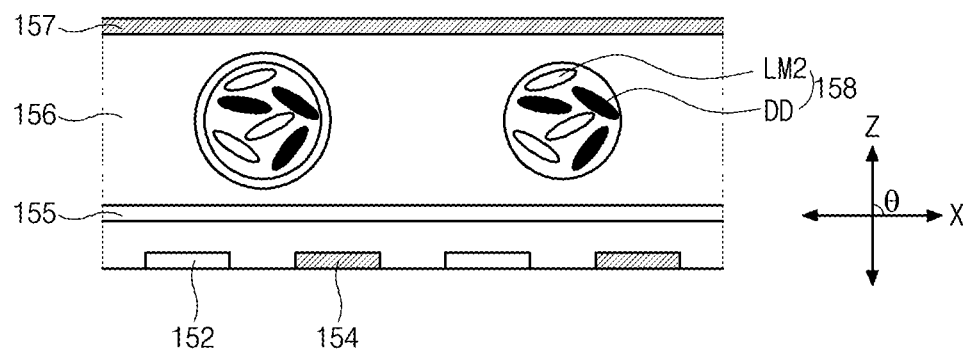
FIGS. 6A to 6C are cross-sectional views schematically showing an alignment of second liquid crystal molecules and dichroic dyes according to a voltage applied to a shutter panel of the present disclosure.
Figure 6B:
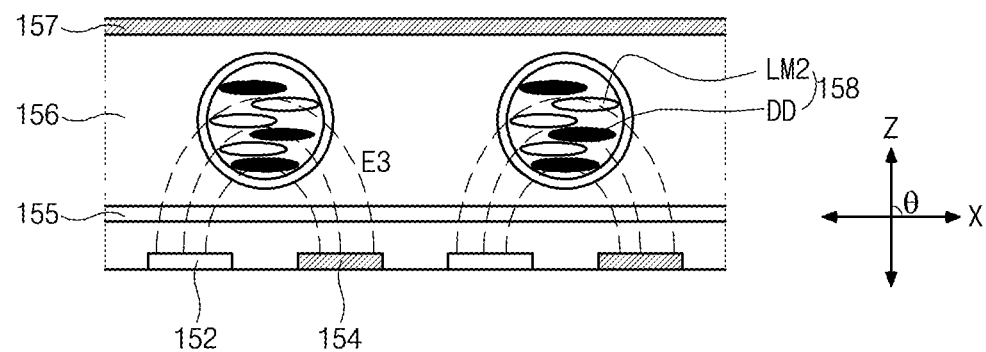
Figure 6C:
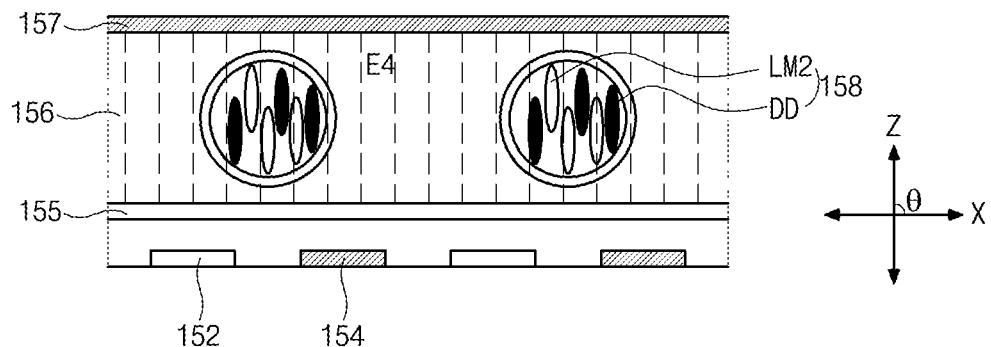

FIGS. 6A to 6C are cross-sectional views schematically showing an alignment of the second liquid crystal molecules and the dichroic dyes according to a voltage applied to the shutter panel of the present disclosure. Descriptions will also be made with reference to FIG. 2.

Here, when the second liquid crystal molecules LM2 are liquid crystal molecules having a negative (−) dielectric anisotropy ($\Delta\varepsilon<0$), the major axes of the second liquid crystal molecules LM2 are aligned perpendicularly to a direction of an electric field, and when the second liquid crystal molecules LM2 are liquid crystal molecules having a positive (+) dielectric anisotropy (Δε>0), the major axes of the second liquid crystal molecules LM2 are aligned in parallel to the direction of the electric field.

Hereinafter, an example of a case in which the second liquid crystal molecules LM2 are positive liquid crystal molecules will be described.

As shown in FIG. 6A, when a voltage is not applied to the fifth to eighth electrodes 152, 154, 155, and 157 of the shutter panel LP, the respective major axes of the plurality of second liquid crystal molecules LM2 and the dichroic dyes DD of the second liquid crystal layer 156 may be randomly aligned.

As shown in FIG. 6B, when a voltage is applied to the fifth electrode 152 and the sixth electrode 154, a horizontal electric field E3, which is substantially parallel to the second substrate 150, may be generated between the fifth electrode 152 and the sixth electrode 154, and as a result, the major axes of the second liquid crystal molecules LM2 and the dichroic dyes DD of each of the plurality of second liquid crystal capsules 158 included in the second liquid crystal layer 156 may be aligned in the X-axis direction along the horizontal electric field E3 generated between the fifth electrode 152 and the sixth electrode 154.

Further, as shown in FIG. 6C, when a voltage is applied to the seventh and eighth electrodes 155 and 157, a vertical electric field E4, which is perpendicular to the second substrate 150, may be generated between the seventh and eighth electrodes 155 and 157, and as a result, the major axes of the second liquid crystal molecules LM2 and the dichroic dyes DD of each of the plurality of second liquid crystal capsules 158 included in the second liquid crystal layer 156 may be aligned in a Z-axis direction along the vertical electric field E4 generated between the seventh electrode 155 and the eighth electrode 157.

Here, the fifth and sixth electrodes 152 and 154 and the seventh and eighth electrodes 155 and 157 may be individually driven, or may be simultaneously driven.

That is, in order to align the major axes of the second liquid crystal molecules LM2 and the dichroic dyes DD in the X-axis direction, only the fifth electrode 152 and the sixth electrode 154 may be driven, and in order to align the major axes of the second liquid crystal molecules LM2 and the dichroic dyes DD in the Z-axis direction, only the seventh electrode 155 and the eighth electrode 157 may be driven. Alternatively, in a state in which the fifth electrode 152 and the sixth electrode 154 are driven so that the major axes of the second liquid crystal molecules LM2 and the dichroic dyes DD are aligned in the X-axis direction, the major axes of the second liquid crystal molecules LM2 and the dichroic dyes DD may be adjusted in the Z-axis direction by driving the seventh electrode 155 and the eighth electrode 157.

Figure 7A:
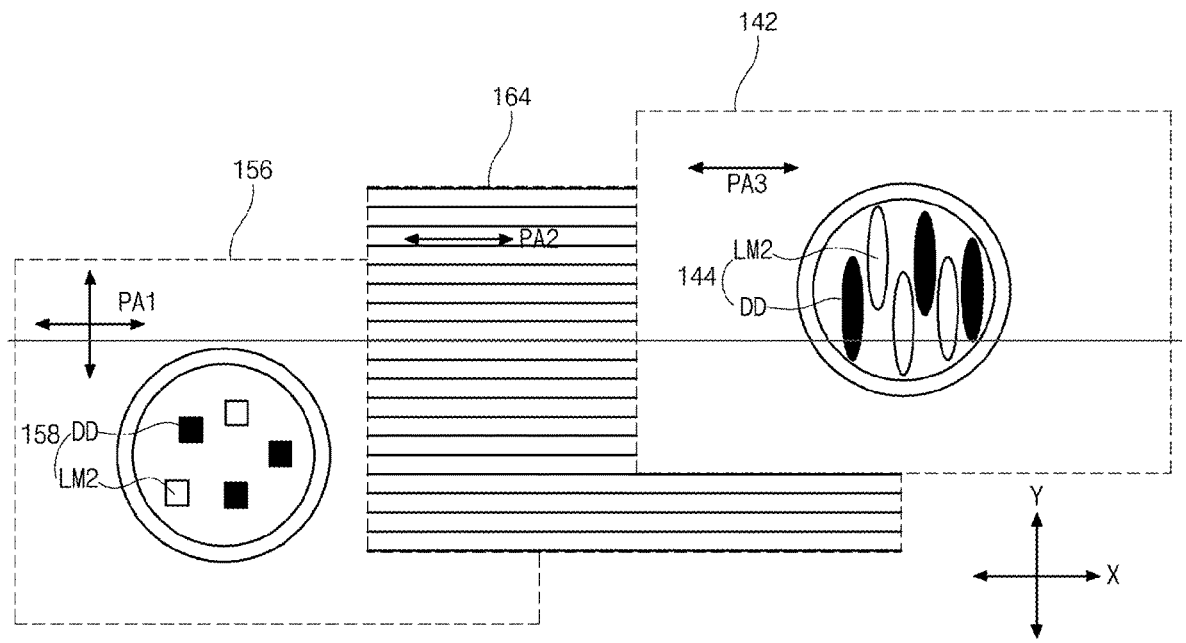
FIG. 7A is a schematic view showing a polarizer and first and second liquid crystal layers in implementation of white gray level of a liquid crystal display device according to the aspect of the present disclosure.
Figure 7A:
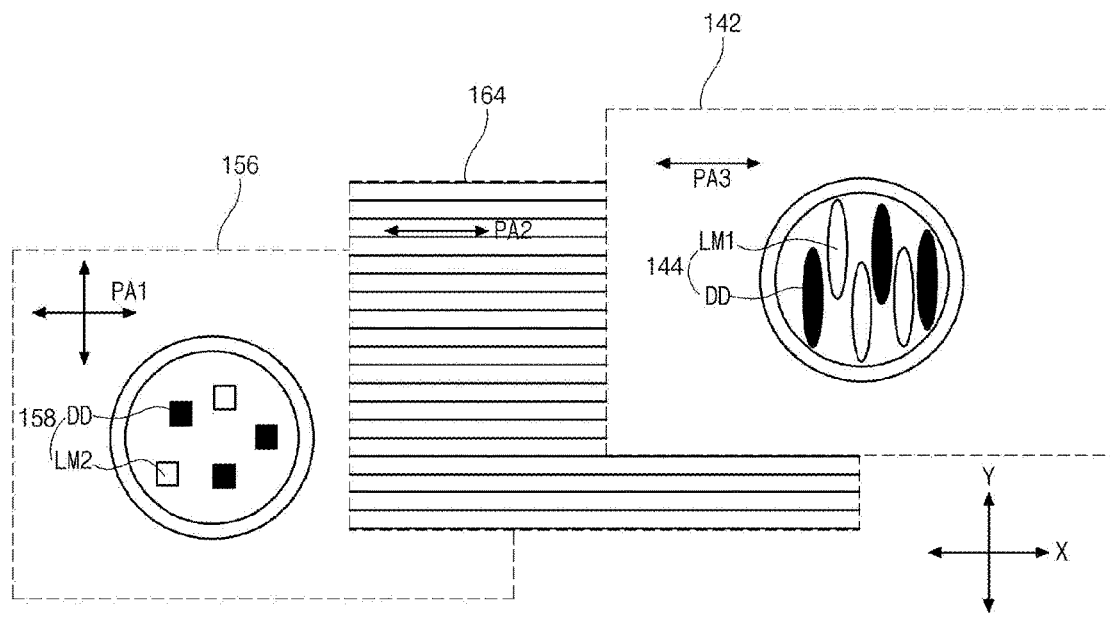
Figure 7B:
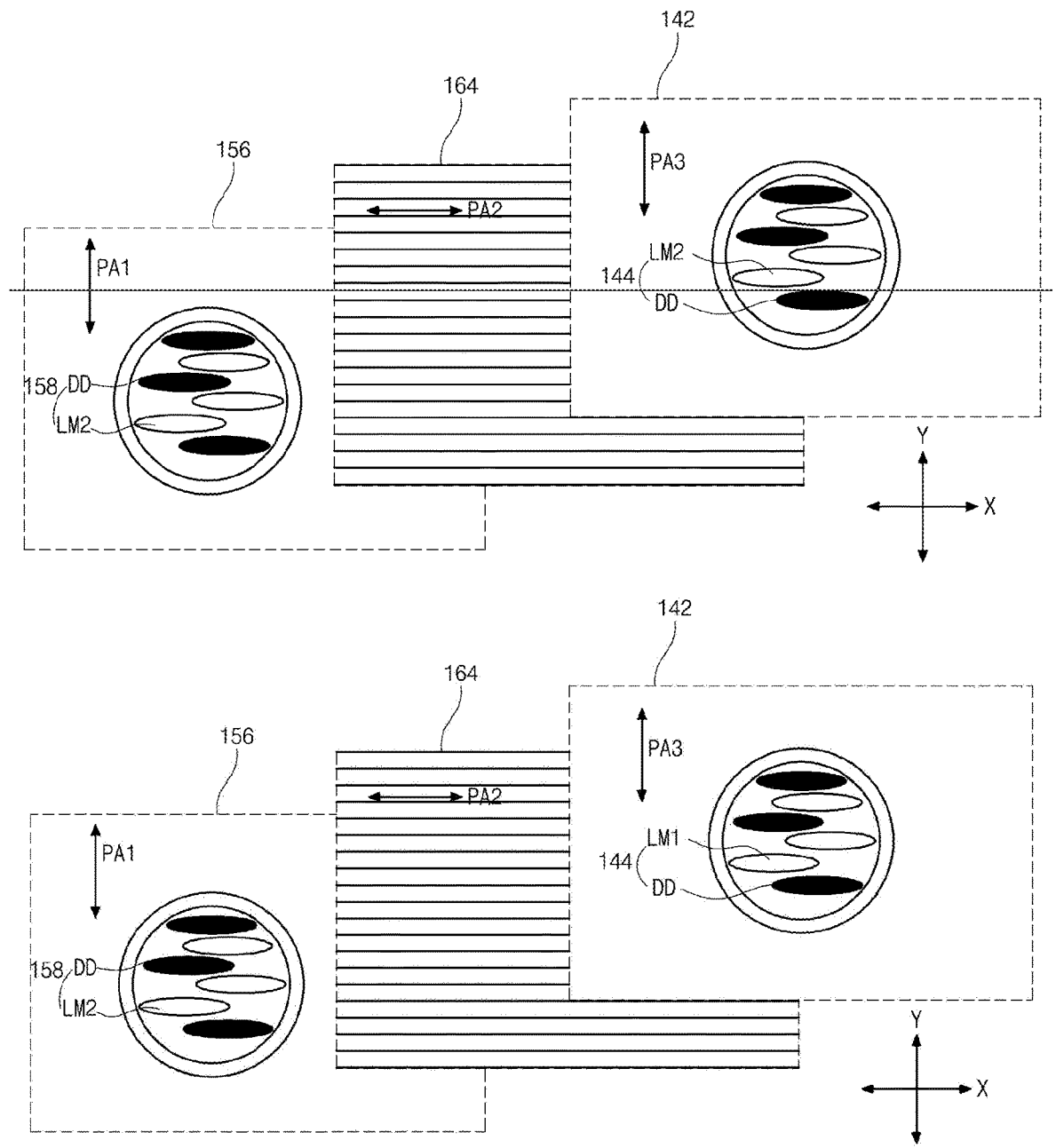
FIG. 7B is a schematic view showing the polarizer and the first and second liquid crystal layers in implementation of black gray level of the liquid crystal display device according to the aspect of the present disclosure.

FIG. 7A is a schematic view showing a polarizer and first and second liquid crystal layers in implementation of white gray level of a liquid crystal display device according to the aspect of the present disclosure, and FIG. 7B is a schematic view showing a polarizer and first and second liquid crystal layers in implementation of black gray level of the liquid crystal display device according to the aspect of the present disclosure. Descriptions will also be made with reference to FIG. 2.

As shown in FIG. 7A, the liquid crystal display device 100 according to the aspect of the present disclosure may include a second liquid crystal layer 156, a polarizer 164 disposed over the second liquid crystal layer 156, and a first liquid crystal layer 142 disposed over the polarizer 164.

Although not shown, a backlight unit may be disposed below the second liquid crystal layer 156.

Each of the first liquid crystal layer 142, the polarizer 164, and the second liquid crystal layer 156 may have a transmission axis and an absorption axis.

Here, the transmission axis and the absorption axis are perpendicular to each other. Hereinafter, a description thereof will be given on the basis of the transmission axis.

Further, minor axes of first and second liquid crystal molecules LM1 and LM2 and dichroic dyes DD included in the first liquid crystal layer 142 and the second liquid crystal layer 156 will be described as transmission axes.

In the liquid crystal display device 100 according to the aspect of the present disclosure, in the implementation of the white gray level, the major axes of the second liquid crystal molecules LM2 and the dichroic dyes DD of each of the plurality of second liquid crystal capsules 158 included in the second liquid crystal layer 156 may be aligned in a Z axis direction of FIG. 4B perpendicular to the polarizer 164 along a vertical electric field generated between the seventh electrode 155 and the eighth electrode 157.

Accordingly, the second liquid crystal layer 156 has a transmission axis PA1 parallel to each of the X axis and the Y axis, and light output from the backlight unit passes through the second liquid crystal layer 156 as it is.

That is, the light output from the backlight unit passes through the second liquid crystal layer 156 without a decrease of a transmittance, which was caused by the lower polarizer of the related art, so that the transmittance can be improved.

In addition, the light passing through the second liquid crystal layer 156 passes through the polarizer 164 having a transmission axis PA2 parallel to the X axis and is changed into and output as polarized light parallel to the X axis.

Further, in the implementation of the white gray level, the major axes of the first liquid crystal molecules LM1 and the dichroic dyes DD of each of the plurality of first liquid crystal capsules 144 included in the first liquid crystal layer 142 may be aligned in the Y-axis direction along a horizontal electric field generated between the third electrode 148 and the fourth electrode 149.

Accordingly, the first liquid crystal layer 142 has a transmission axis PA3 parallel to the X axis, and the polarized light, which passes through the polarizer 164 and is parallel to the X axis, passes through the first liquid crystal layer 142 as it is and is output.

Meanwhile, as shown in FIG. 7B, in the implementation of the black gray level, the major axes of the second liquid crystal molecules LM2 and the dichroic dyes DD of each of the plurality of second liquid crystal capsules 158 included in the second liquid crystal layer 156 may be aligned in the X-axis direction along a horizontal electric field generated between the fifth electrode 152 and the sixth electrode 154.

Accordingly, the second liquid crystal layer 156 has the transmission axis PA1 parallel to the Y axis. The light output from the backlight unit is changed into polarized light in a direction parallel to the Y axis by the plurality of realigned second liquid crystal molecules LM2 and the realigned dichroic dyes DD, and then is blocked by the polarizer 164 having the transmission axis PA2 parallel to the X axis and is not supplied to the first liquid crystal layer 142.

Further, in the implementation of the black gray level, the major axes of the first liquid crystal molecules LM1 and the dichroic dyes DD of each of the plurality of first liquid crystal capsules 144 included in the first liquid crystal layer 142 are aligned in the X-axis direction along the horizontal electric field generated between the first electrode 138 and the second electrode 140 and the first liquid crystal layer 142 has the transmission axis PA3 parallel to the Y axis, and thus some of the light, which is not blocked by the polarizer 164, may be re-blocked by the first liquid crystal layer 142 having the transmission axis PA3 parallel to the Y axis and a contrast ratio can be improved.

As described above, in the liquid crystal display device 100 according to the aspect of the present disclosure, each of the display panel DP and the shutter panel LP, which was composed of two substrates in the related art, includes one substrate 120 or 150 by omitting one substrate, that is, the liquid crystal display device 100, which was composed of four substrates in the related art, includes two substrates by omitting two substrates, and thus a contrast ratio can be improved while a thickness and weight of the liquid crystal display device 100 are reduced.

Further, the first and second liquid crystal layers 142 and 156 of the display panel DP and the shutter panel LP are formed using the plurality of first and second liquid crystal capsules 144 and 158, respectively, and thus the manufacturing processes can be simplified by omitting alignment film forming processes, liquid crystal dropping processes, and a bonding process.

Specifically, in the liquid crystal display device 100 according to the aspect of the present disclosure, each of the first liquid crystal layer 142 and the second liquid crystal layer 156 of the display panel DP and the shutter panel LP includes the dichroic dyes DD, a polarizing function may be performed by adjusting directions of the transmission axes PA3 and PA1 of the first liquid crystal layer 142 and the second liquid crystal layer 156 on the basis of the transmission axis PA2 of the polarizer 164, and thus the polarizers 36 and 48 of FIG. 1, which were respectively formed on the outer surfaces of the first substrate 20 FIG. 1 and the second substrate 40 of FIG. 1 in the related art, can be removed. Therefore, a process can be simplified, a thin liquid crystal display device can be implemented, and the transmittance and the contrast ratio can be further improved.

According to the present disclosure, by forming a display panel and a shutter panel using liquid crystal capsules, the number of substrates to be used can be reduced, a thickness and weight of a display device can be reduced, a contrast ratio can be improved, and the display device can be easily applied to a flexible display device.

Further, according to the present disclosure, by including a dichroic dye in liquid crystal capsules of a display panel and a shutter panel, upper and lower polarizers are omissible, a thickness of the liquid crystal display device can be reduced, and a contrast ratio and sharpness of an image can be further improved.

It will be apparent to those skilled in the art that various modifications and variations can be made in a device of the present disclosure without departing from the sprit or scope of the aspect. Thus, it is intended that the present disclosure covers the modifications and variations of this disclosure provided they come within the scope of the appended claims and their equivalents.

What is claimed is:

1. A liquid crystal display device comprising:
   a first substrate and a second substrate facing and spaced apart from each other, each of the first and second substrates including a pixel region;
   a first liquid crystal layer disposed on an inner surface of the first substrate and including a plurality of first liquid crystal capsules;
   a second liquid crystal layer disposed on an inner surface of the second substrate and including a plurality of second liquid crystal capsules; and
   a polarizer disposed between the first liquid crystal layer and the second liquid crystal layer,
   wherein each of the plurality of first liquid crystal capsules and the plurality of second liquid crystal capsules includes liquid crystal molecules and dichroic dyes.

2. The liquid crystal display device of claim 1, wherein the liquid crystal molecules and the dichroic dyes are rotated by an electric field, and wherein the liquid crystal molecules and the dichroic dyes of the first liquid crystal capsule are rotated on a first plane and the liquid crystal molecules and the dichroic dyes of the second liquid crystal capsule are rotated on a second plane perpendicular to the first plane.

3. The liquid crystal display device of claim 2, wherein the first plane is parallel to the polarizer and the second plane is perpendicular to the polarizer.

4. The liquid crystal display device of claim 1, further comprising:
   a thin film transistor disposed in the pixel region on the inner surface of the first substrate;
   a black matrix disposed at a boundary of the pixel region under the thin film transistor;
   a color filter layer disposed under the black matrix;
   a first electrode and a second electrode under the color filter layer, wherein the first electrode and the second electrode each have a bar shape and are alternately disposed in a first direction; and
   a third electrode and a fourth electrode between the first and second electrodes and the first liquid crystal layer, wherein the third electrode and the fourth electrode each have a bar shape and are alternately disposed in a second direction perpendicular to the first direction.

5. The liquid crystal display device of claim 4, further comprising:
   a fifth electrode and a sixth electrode on the inner surface of the second substrate, wherein the fifth electrode and the sixth electrode each have a bar shape and are alternately disposed in the first direction;
   a seventh electrode having a plate shape and disposed between the fifth and sixth electrodes and the second liquid crystal layer; and
   an eighth electrode having a plate shape and disposed between the second liquid crystal layer and the polarizer.

6. The liquid crystal display device of claim 1, wherein each of the liquid crystal molecules is one of a nematic liquid crystal, a ferroelectric liquid crystal, and a flexoelectric liquid crystal.

7. The liquid crystal display device of claim 1, further comprising:
   a first adhesive layer disposed between the first liquid crystal layer and the polarizer; and
   a second adhesive layer disposed between the second liquid crystal layer and the polarizer.

8. The liquid crystal display device of claim 1, further comprising a backlight unit disposed below the second substrate.

9. A liquid crystal display device having first and second substrates spaced apart from each other, comprising:
   a first liquid crystal layer disposed on the first substrate, including a plurality of first liquid crystal capsules and having a first transmission axis;
   a second liquid crystal layer disposed on the second substrate, including a plurality of second liquid crystal capsules having a second transmission axis; and a polarizer having a third transmission axis parallel to an X axis and performing polarization for the first and second liquid crystal layers by adjusting orientations of the first and second transmission axes, wherein, in implementing a white gray level, the second transmission axis is parallel to the X axis and a Y axis and light from a light source passes through the second liquid crystal layer, and the light passed through the second liquid crystal layer passes through the polarizer to be polarized light parallel to the X axis, and wherein, in implementing a black gray level, the second transmission axis is parallel to the Y axis and the polarizer blocks the light from the second liquid crystal layer.

10. The liquid crystal display device of claim 9, wherein each of the plurality of first liquid crystal capsules and the plurality of second liquid crystal capsules includes liquid crystal molecules and dichroic dyes.

11. The liquid crystal display device of claim 10, wherein the liquid crystal molecules and the dichroic dyes are rotated by an electric field, and wherein the liquid crystal molecules and the dichroic dyes of the first liquid crystal capsule are rotated on a first plane and the liquid crystal molecules and the dichroic dyes of the second liquid crystal capsule are rotated on a second plane perpendicular to the first plane.

12. The liquid crystal display device of claim 11, wherein the first plane is parallel to the polarizer and the second plane is perpendicular to the polarizer.

13. The liquid crystal display device of claim 9, further comprising:

a thin film transistor disposed in a pixel region on an inner surface of the first substrate;

a black matrix disposed at a boundary of the pixel region under the thin film transistor;

a color filter layer disposed under the black matrix;

a first electrode and a second electrode under the color filter layer, wherein the first electrode and the second electrode each have a bar shape and are alternately disposed in a first direction; and a third electrode and a fourth electrode between the first and second electrodes and the first liquid crystal layer, wherein the third electrode and the fourth electrode each have a bar shape and are alternately disposed in a second direction perpendicular to the first direction.

14. The liquid crystal display device of claim 13, further comprising:

a fifth electrode and a sixth electrode on an inner surface of the second substrate, wherein the fifth electrode and the sixth electrode each have a bar shape and are alternately disposed in the first direction;

a seventh electrode having a plate shape and disposed between the fifth and sixth electrodes and the second liquid crystal layer; and an eighth electrode having a plate shape and disposed between the second liquid crystal layer and the polarizer.

15. The liquid crystal display device of claim 10, wherein each of the liquid crystal molecules is one of a nematic liquid crystal, a ferroelectric liquid crystal, and a flexoelectric liquid crystal.

16. The liquid crystal display device of claim 9, further comprising:

a first adhesive layer disposed between the first liquid crystal layer and the polarizer; and a second adhesive layer disposed between the second liquid crystal layer and the polarizer.

17. The liquid crystal display device of claim 9, further comprising a backlight unit disposed below the second substrate.

* * * * *